US012520955B2

United States Patent
Yang

(10) Patent No.: US 12,520,955 B2
(45) Date of Patent: Jan. 13, 2026

(54) ELECTRIC BABY BOUNCER

(71) Applicant: ZT (Fujian) Industrial Co., Ltd., Zhangzhou (CN)

(72) Inventor: Jianbo Yang, Zhangzhou (CN)

(73) Assignee: ZT (Fujian) Industrial Co., Ltd., Zhangzhou (CN)

( * ) Notice: Subject to any disclaimer, the term of this patent is extended or adjusted under 35 U.S.C. 154(b) by 191 days.

(21) Appl. No.: 18/385,410

(22) Filed: Oct. 31, 2023

(65) Prior Publication Data

US 2025/0040727 A1    Feb. 6, 2025

(30) Foreign Application Priority Data

Aug. 2, 2023   (CN) .......................... 202322061587.4

(51) Int. Cl.
  *A47D 13/10*    (2006.01)
  *A47D 9/02*    (2006.01)

(52) U.S. Cl.
  CPC ........... *A47D 13/107* (2013.01); *A47D 9/057* (2022.08)

(58) Field of Classification Search
  CPC .... A47D 13/107; A47D 13/105; A47D 13/10; A47D 9/057
  See application file for complete search history.

(56) References Cited

U.S. PATENT DOCUMENTS 8,197,005 B2 * 6/2012 Hopke ................... A47D 13/10
297/260.2
2014/0339867 A1  11/2014 Hopke et al.

FOREIGN PATENT DOCUMENTS

KR        20120045816 A  *  5/2012  ............. A47D 9/057

* cited by examiner

*Primary Examiner* — Milton Nelson, Jr.
(74) *Attorney, Agent, or Firm* — Bayramoglu Law Offices LLC

(57) ABSTRACT

An electric baby bouncer includes a base and a cradle frame. An X-axis moving plate for performing a horizontal linear reciprocating motion and an X-axis driving mechanism for driving the X-axis moving plate to move are provided in the base. A Z-axis moving plate for performing a vertical linear reciprocating motion is provided above the X-axis moving plate. A Z-axis driving mechanism for driving the Z-axis moving plate to move is provided on the X-axis moving plate. A bottom part of the cradle frame is connected to the Z-axis moving plate. The Z-axis moving plate is configured to extend out of a top part of the base. The X-axis driving mechanism drives the X-axis moving plate to perform the horizontal reciprocating motion, and the Z-axis driving mechanism drives the Z-axis moving plate to perform the vertical reciprocating motion. The Z-axis driving mechanism is located on the X-axis moving plate.

8 Claims, 5 Drawing Sheets

ELECTRIC BABY BOUNCER

CROSS REFERENCE TO THE RELATED APPLICATIONS

This application is based upon and claims priority to Chinese Patent Application No. 202322061587.4, filed on Aug. 2, 2023, the entire contents of which are incorporated herein by reference.

TECHNICAL FIELD

The present disclosure relates to the field of children's products, and in particular to an electric baby bouncer.

BACKGROUND

A baby bouncer, also known as baby swing, soothes the baby through fixed, gentle, and regular bounces. After a baby is born, the bouncing stimulus it received in the womb disappears, which can make the baby uneasy. Therefore, the baby needs to be bounced again to be satisfied. Existing baby bouncers are divided into manual and automatic baby bouncers, both of which can only swing back and forth in a single direction. The unidirectional swing cannot offer a comfortable sitting or lying experience for babies, and cannot achieve an ideal sleep inducing function.

SUMMARY

The present disclosure provides an electric baby bouncer, which mainly aims to solve the problem of existing baby bouncers. That is, the existing baby bouncers can only swing back and forth in a single direction, failing to offer a comfortable sitting or lying experience for babies or to achieve an ideal sleep inducing function.

To solve the above technical problem, the present disclosure adopts the following technical solution.

An electric baby bouncer includes a base and a cradle frame, where an X-axis moving plate for performing a horizontal linear reciprocating motion and an X-axis driving mechanism for driving the X-axis moving plate to move are provided in the base; a Z-axis moving plate for performing a vertical linear reciprocating motion is provided above the X-axis moving plate; a Z-axis driving mechanism for driving the Z-axis moving plate to move is provided on the X-axis moving plate; a bottom part of the cradle frame is connected to the Z-axis moving plate; the Z-axis moving plate is configured to extend out of a top part of the base; a top surface of the base is provided with a controller; and the X-axis driving mechanism and the Z-axis driving mechanism are controlled by the controller.

Further, the base includes an upper housing and a lower housing that are connected to each other; the X-axis moving plate is located inside the lower housing; a front guide rod seat group and a rear guide rod seat group are provided in the lower housing; the front guide rod seat group includes two front guide rod seats arranged at left and right sides; a front guide rod is provided between the two front guide rod seats; the rear guide rod seat group includes two rear guide rod seats arranged at the left and right sides; a rear guide rod is provided between the two rear guide rod seats; a front end of the X-axis moving plate is connected to two front guide rod sleeves arranged at the left and right sides; the front guide rod passes through the two front guide rod sleeves; a rear end of the X-axis moving plate is connected to two rear guide rod sleeves arranged at the left and right sides; the rear guide rod passes through the two rear guide rod sleeves; and the upper housing is provided with a movement opening.

Further, the X-axis driving mechanism includes an X-axis driving motor, an X-axis small pulley, an X-axis big pulley, an X-axis worm, an X-axis big gear, and an X-axis small gear; the X-axis small pulley is connected to an output shaft of the X-axis driving motor; the X-axis small pulley and the X-axis big pulley are connected through a transmission belt; the X-axis big pulley is connected to an end of the X-axis worm; the X-axis big gear is meshed with the X-axis worm; the X-axis small gear is coaxial with the X-axis big gear and located below the X-axis big gear; an X-axis rack is connected inside the base; the X-axis small gear is meshed with the X-axis rack; a top part of the X-axis moving plate is provided with an X-axis device cover; and the X-axis driving motor, the X-axis worm, and the X-axis big gear are located inside the X-axis device cover.

Further, the Z-axis driving mechanism includes a Z-axis driving motor, a Z-axis small pulley, a Z-axis big pulley, a Z-axis worm, a Z-axis big gear, and a Z-axis small gear; the Z-axis small pulley is connected to an output shaft of the Z-axis driving motor; the Z-axis small pulley and the Z-axis big pulley are connected through a transmission belt; the Z-axis big pulley is connected to an end of the Z-axis worm; the Z-axis big gear is meshed with the Z-axis worm; the Z-axis small gear is coaxial with the Z-axis big gear and located at a side of the Z-axis big gear; a bottom part of the Z-axis moving plate is connected to a Z-axis rack; the Z-axis small gear is meshed with the Z-axis rack; a top part of the X-axis moving plate is provided with a Z-axis device cover; the Z-axis driving motor, the Z-axis worm, the Z-axis big gear, and the Z-axis small gear are located inside the Z-axis device cover; and the Z-axis rack passes through the Z-axis device cover.

Further, a top part of the X-axis moving plate is provided with four upper rod sleeves; a bottom part of the Z-axis moving plate is connected to four upper guide rods; each of the upper guide rods corresponds to one of the upper rod sleeves; and the upper guide rod is nested inside the corresponding upper rod sleeve.

Further, an X-axis moving cover housing connected to the X-axis moving plate is provided above the X-axis moving plate; a top surface of the Z-axis moving plate is connected to a Z-axis moving cover housing; a top part of the X-axis moving cover housing is located inside a bottom part of the Z-axis moving cover housing; a top surface of the Z-axis moving cover housing is connected to a mounting seat; and the cradle frame is connected to the mounting seat.

Further, a left photoelectric switch and a right photoelectric switch are provided in the base and configured to sense a movement distance of the X-axis moving plate; and the left photoelectric switch and the right photoelectric switch are connected to the controller.

Furthermore, a top surface of the Z-axis device cover is provided with an upper photoelectric switch; the top part of the X-axis moving plate is provided with a lower photoelectric switch; the bottom part of the Z-axis moving plate is connected to a lifting rod; and a bottom part of the lifting rod is provided with a backwardly extending sensing plate.

Further, the cradle frame is connected to a toy bar.

According to the description of the present disclosure, compared with the prior art, the present disclosure has the following advantages. The X-axis driving mechanism drives the X-axis moving plate to perform the horizontal reciprocating motion. The Z-axis driving mechanism drives the Z-axis moving plate to perform the vertical reciprocating motion. The Z-axis driving mechanism is located on the X-axis moving plate. Therefore, when the X-axis driving mechanism and the Z-axis driving mechanism work simultaneously, the cradle frame can perform the horizontal linear reciprocating motion and the vertical linear reciprocating motion simultaneously. Such a design offers the baby with a desired sitting or lying experience, and achieves a desired baby sleep inducing effect.

DETAILED DESCRIPTION OF THE EMBODIMENTS

Figure 1:
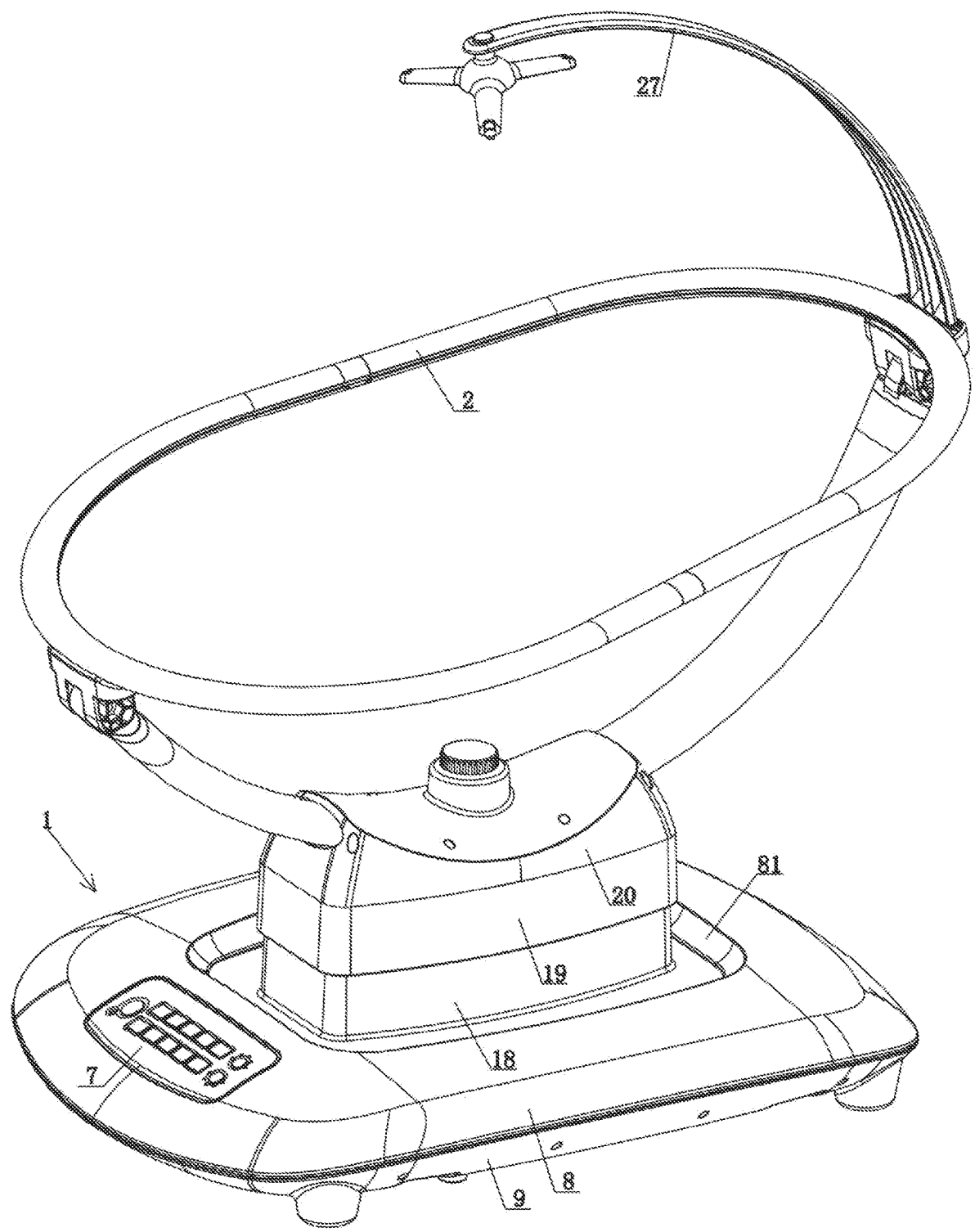
FIG. 1 is a structural diagram of an electric baby bouncer according to the present disclosure.

Referring to FIGS. 1 to 5, an electric baby bouncer includes base 1 and cradle frame 2. X-axis moving plate 3 for performing a horizontal linear reciprocating motion and X-axis driving mechanism 4 for driving the X-axis moving plate 3 to move are provided in the base 1. Z-axis moving plate 5 for performing a vertical linear reciprocating motion is provided above the X-axis moving plate 3. Z-axis driving mechanism 6 for driving the Z-axis moving plate 5 to move is provided on the X-axis moving plate 3. A bottom part of the cradle frame 2 is connected to the Z-axis moving plate 5. The Z-axis moving plate 5 is configured to extend out of a top part of the base 1. A top surface of the base 1 is provided with controller 7. The X-axis driving mechanism 4 and the Z-axis driving mechanism 6 are controlled by the controller 7.

Referring to FIGS. 1 to 4, the base 1 includes upper housing 8 and lower housing 9 that are connected to each other. The X-axis moving plate 3 is located inside the lower housing 8. A front guide rod seat group and a rear guide rod seat group are provided in the lower housing 8. The front guide rod seat group includes two front guide rod seats 10 arranged at left and right sides. Front guide rod 11 is provided between the two front guide rod seats 10. The rear guide rod seat group includes two rear guide rod seats 12 arranged at the left and right sides. Rear guide rod 13 is provided between the two rear guide rod seats 12. A front end of the X-axis moving plate 3 is connected to two front guide rod sleeves 14 arranged at the left and right sides. The front guide rod 11 passes through the two front guide rod sleeves 14. A rear end of the X-axis moving plate 3 is connected to two rear guide rod sleeves 15 arranged at the left and right sides. The rear guide rod 13 passes through the two rear guide rod sleeves 15. The upper housing 8 is provided with movement opening 81. The controller 7 is located on a top surface of the upper housing 8.

Referring to FIGS. 1 to 4, the X-axis driving mechanism 4 includes X-axis driving motor 41, X-axis small pulley 42, X-axis big pulley 43, X-axis worm 44, X-axis big gear 45, and X-axis small gear 46. The X-axis driving motor 41 is horizontally provided. The X-axis small pulley 42 is connected to an output shaft of the X-axis driving motor 41. The X-axis small pulley 42 and the X-axis big pulley 43 are connected through a transmission belt. The X-axis worm 44 is horizontally provided. The X-axis big pulley 43 is connected to an end of the X-axis worm 44. The X-axis big gear 45 is meshed with the X-axis worm 44. The X-axis small gear 46 is coaxial with the X-axis big gear 45 and located below the X-axis big gear 45. X-axis rack 47 is connected inside the base 1. Specifically, the X-axis rack 47 is connected to the lower housing 9. The X-axis small gear 46 is meshed with the X-axis rack 47. A top part of the X-axis moving plate 3 is provided with X-axis device cover 48. The X-axis driving motor 41, the X-axis worm 44, and the X-axis big gear 45 are located inside the X-axis device cover 48. The X-axis driving motor 41 is connected to the controller 7. The X-axis driving motor 41 is rotatable in forward and reverse directions.

Figure 2:
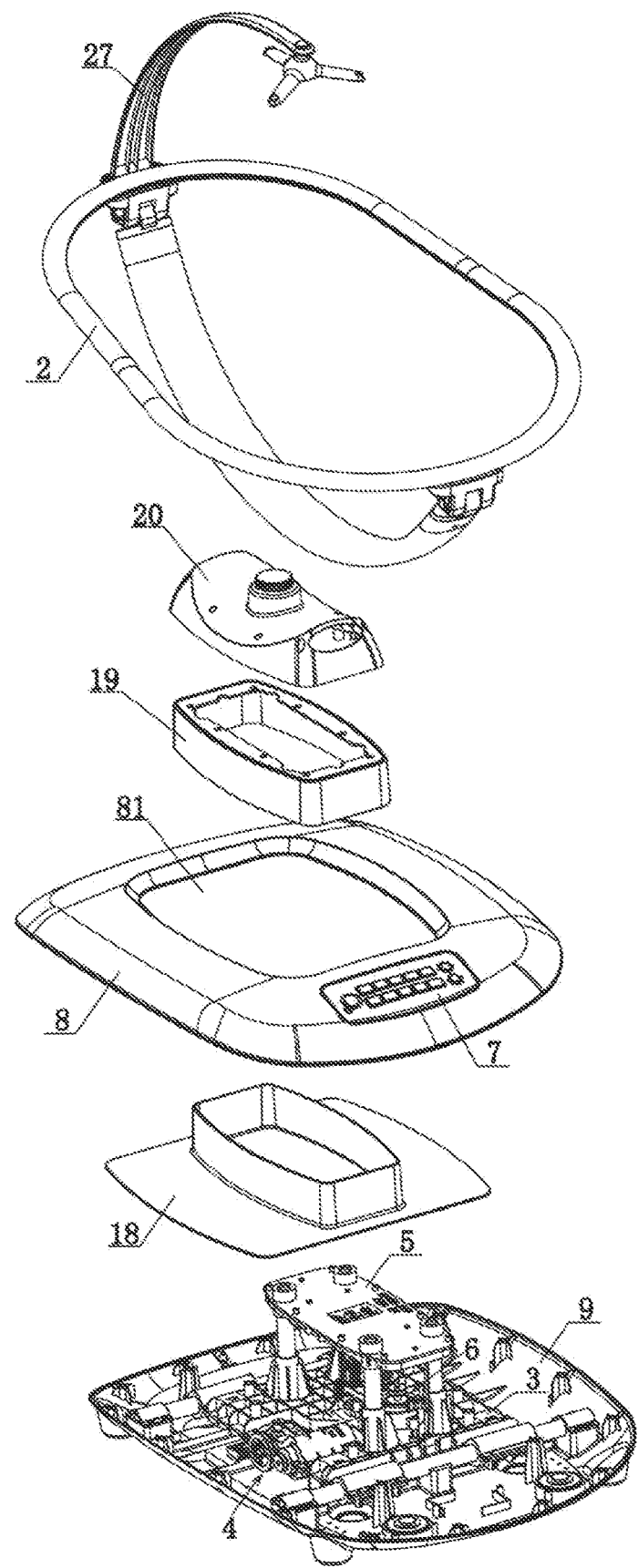
FIG. 2 is an exploded view of the electric baby bouncer according to the present disclosure.
Figure 3:
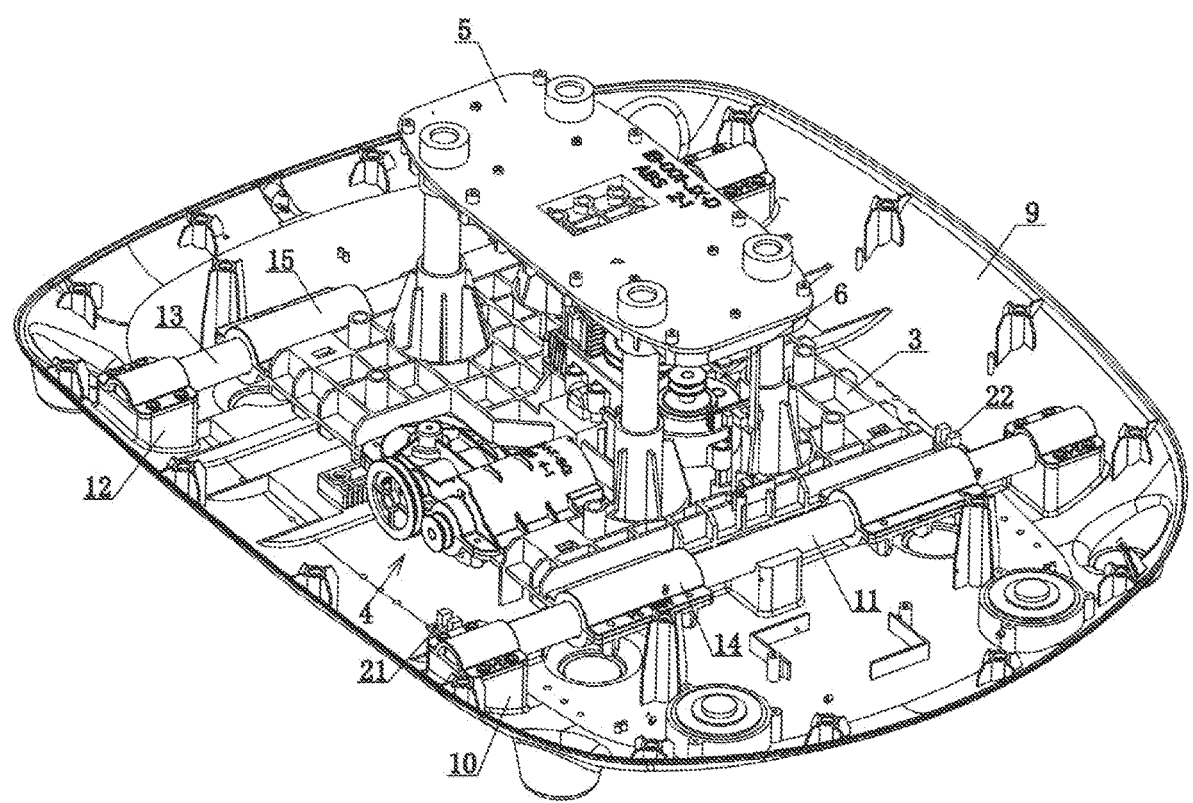
FIG. 3 is an internal structural diagram of a base of the electric baby bouncer according to the present disclosure.
Figure 4:
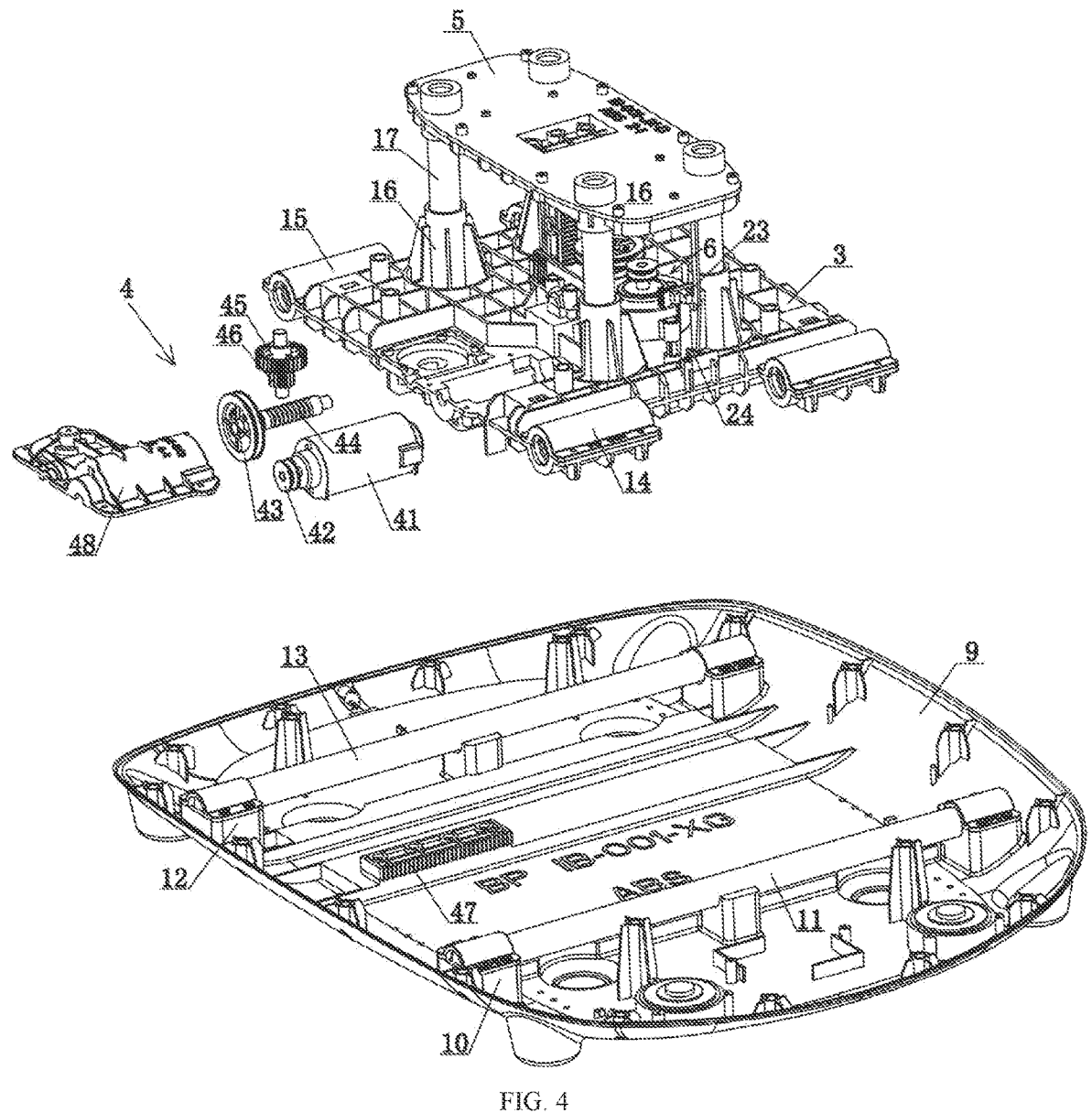
FIG. 4 is an internal exploded view of the base of the electric baby bouncer according to the present disclosure.

Referring to FIGS. 2 to 4, the X-axis driving motor 41 drives the X-axis worm 44 to rotate through a belt. The X-axis worm 44 drives the X-axis big gear 45 to rotate. The X-axis big gear 45 drives the X-axis small gear 46 to rotate. The X-axis small gear 46 drives the X-axis rack 47 to move horizontally, thereby achieving the horizontal movement of the X-axis moving plate 3. The front guide rod 11 is matched with the front guide rod sleeves 14, and the rear guide rod 13 is matched with the rear guide rod sleeves 15. The design avoids forward and backward displacement of the X-axis moving plate 3 when the X-axis moving plate performs a horizontal linear reciprocating motion in left and right directions.

Referring to FIGS. 1 to 5, the Z-axis driving mechanism 6 includes Z-axis driving motor 61, Z-axis small pulley 62, Z-axis big pulley 63, Z-axis worm 64, Z-axis big gear 65, and Z-axis small gears 66. The Z-axis driving motor 61 is vertically provided. The Z-axis small pulley 62 is connected to an output shaft of the Z-axis driving motor 61. The Z-axis small pulley 62 and the Z-axis big pulley 63 are connected through a transmission belt. The Z-axis worm 64 is vertically provided. The Z-axis big pulley 63 is connected to an end of the Z-axis worm 64. The Z-axis big gear 65 is meshed with the Z-axis worm 64. The Z-axis small gear 66 is coaxial with the Z-axis big gear 65 and located at a side of the Z-axis big gear 65. A bottom part of the Z-axis moving plate 5 is connected to Z-axis racks 67. The Z-axis small gears 66 are meshed with the Z-axis racks 67. The top part of the X-axis moving plate 3 is provided with Z-axis device cover 68. The Z-axis driving motor 61, the Z-axis worm 64, the Z-axis big gear 65, and the Z-axis small gear 66 are located inside the Z-axis device cover 68. The Z-axis racks 67 pass through the Z-axis device cover 68. In this embodiment, there are two Z-axis small gears 66. The two Z-axis small gears 66 are respectively located at left and right sides of the Z-axis big gear 65. There are two Z-axis racks 67. The two Z-axis racks 67 are arranged at left and right sides.

Figure 5:
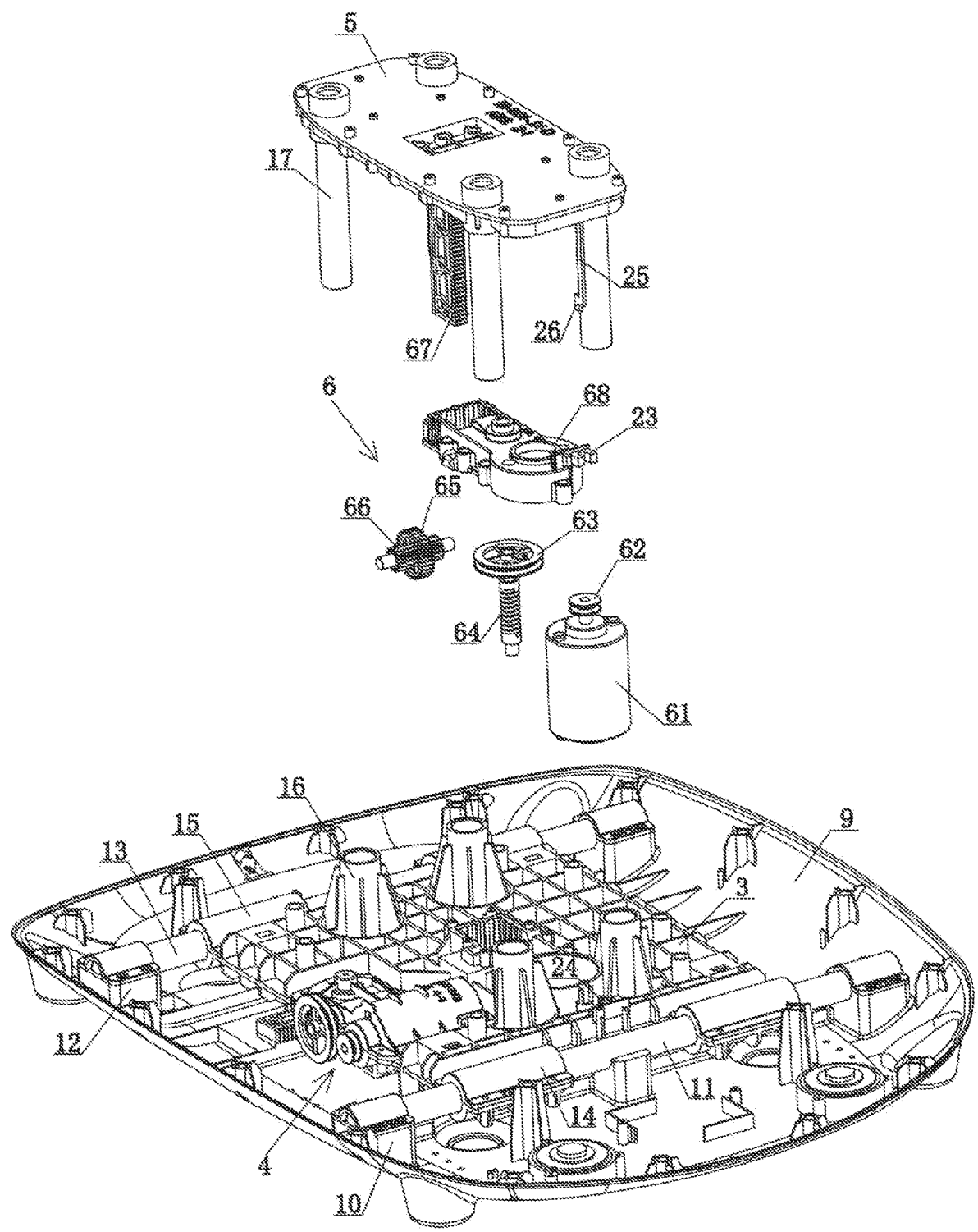
FIG. 5 is another internal exploded view of the base of the electric baby bouncer according to the present disclosure.

Referring to FIGS. 3 to 5, the top part of the X-axis moving plate 3 is provided with four upper rod sleeves 16. The bottom part of the Z-axis moving plate 5 is connected to four upper guide rods 17. Each of the upper guide rods 17 corresponds to one of the upper rod sleeves 16. The upper guide rod 17 is nested inside the corresponding upper rod sleeve 16.

The Z-axis driving motor 61 drives the Z-axis worm 64 to rotate through a belt. The Z-axis worm 64 drives the Z-axis big gear 65 to rotate. The Z-axis big gear 65 drives the Z-axis small gears 66 to rotate. The Z-axis small gears 66 drive the Z-axis rack Z7 to move vertically, thereby achieving the vertical movement of the Z-axis moving plate 5. The upper guide rod 17 is matched with the upper rod sleeve 16 to avoid displacement of the Z-axis moving plate 5 in other directions when the Z-axis moving plate performs a vertical linear reciprocating motion.

Referring to FIGS. 2 to 5, X-axis moving cover housing 18 connected to the X-axis moving plate 3 is provided above the X-axis moving plate. A top surface of the Z-axis moving plate 5 is connected to Z-axis moving cover housing 19. A top part of the X-axis moving cover housing 18 is located inside a bottom part of the Z-axis moving cover housing 19. A top surface of the Z-axis moving cover housing 19 is connected to mounting seat 20. The cradle frame 2 is connected to the mounting seat 20. The X-axis moving cover housing 18 covers the movement opening 81. The Z-axis moving cover housing 19 covers the Z-axis moving plate 5. The four upper guide rods 17 are located inside the X-axis moving cover housing 18 and the Z-axis moving cover housing 19.

Referring to FIGS. 3 to 5, left photoelectric switch 21 and right photoelectric switch 22 are provided in the base 1 and configured to sense a movement distance of the X-axis moving plate 3. The left photoelectric switch 21 and the right photoelectric switch 22 are connected to the controller 7. Specifically, the left photoelectric switch 21 and the right photoelectric switch 22 are located inside the lower housing 9. A top surface of the Z-axis device cover 68 is provided with upper photoelectric switch 23. The top part of the X-axis moving plate 3 is provided with lower photoelectric switch 24. The bottom part of the Z-axis moving plate 5 is connected to lifting rod 25. A bottom part of the lifting rod 25 is provided with backwardly extending sensing plate 26. The upper photoelectric switch 23 and the lower photoelectric switch 24 are configured to control the movement distance of the Z-axis moving plate 5 through sensing information of the sensing plate 26.

Referring to FIGS. 1 to 2, the cradle frame 2 is connected to a toy bar 27. The toy bar 27 is configured to hang a toy for entertaining a baby.

Referring to FIGS. 1 to 5, the design principle of the present disclosure is as follows. The X-axis driving mechanism 4 drives the X-axis moving plate 3 to perform the horizontal linear reciprocating motion. The Z-axis driving mechanism 4 drives the Z-axis moving plate 5 to perform the vertical linear reciprocating motion. The Z-axis driving mechanism 4 is located on the X-axis moving plate 3. Therefore, when the X-axis driving mechanism 4 and the Z-axis driving mechanism 6 work simultaneously, the cradle frame 2 can perform the horizontal linear reciprocating motion and the vertical linear reciprocating motion simultaneously. Such a design offers the baby with a desired sitting or lying experience, and achieves a desired baby sleep inducing effect. The control method of the controller 7 is a common one in the art, and will not be repeated herein.

The above described are merely specific implementations of the present disclosure, but the design concept of the present disclosure is not limited thereto. Any non-substantial changes made to the present disclosure based on the concept of the present disclosure should fall within the protection scope of the present disclosure.

What is claimed is:

1. An electric baby bouncer, comprising a base and a cradle frame, wherein an X-axis moving plate for performing a horizontal linear reciprocating motion and an X-axis driving mechanism for driving the X-axis moving plate to move are provided in the base; a Z-axis moving plate for performing a vertical linear reciprocating motion is provided above the X-axis moving plate; a Z-axis driving mechanism for driving the Z-axis moving plate to move is provided on the X-axis moving plate; a bottom part of the cradle frame is connected to the Z-axis moving plate; the Z-axis moving plate is configured to extend out of a top part of the base; a top surface of the base is provided with a controller; and the X-axis driving mechanism and the Z-axis driving mechanism are controlled by the controller; and the base comprises an upper housing and a lower housing, wherein the upper housing and the lower housing are connected to each other; the X-axis moving plate is located inside the lower housing; a front guide rod seat group and a rear guide rod seat group are provided in the lower housing; the front guide rod seat group comprises two front guide rod seats arranged at left and right sides; a front guide rod is provided between the two front guide rod seats; the rear guide rod seat group comprises two rear guide rod seats arranged at the left and right sides; a rear guide rod is provided between the two rear guide rod seats; a front end of the X-axis moving plate is connected to two front guide rod sleeves arranged at the left and right sides; the front guide rod passes through the two front guide rod sleeves; a rear end of the X-axis moving plate is connected to two rear guide rod sleeves arranged at the left and right sides; the rear guide rod passes through the two rear guide rod sleeves; and the upper housing is provided with a movement opening.

2. The electric baby bouncer according to claim 1, wherein an X-axis moving cover housing connected to the X-axis moving plate is provided above the X-axis moving plate; a top surface of the Z-axis moving plate is connected to a Z-axis moving cover housing; a top part of the X-axis moving cover housing is located inside a bottom part of the Z-axis moving cover housing; a top surface of the Z-axis moving cover housing is connected to a mounting seat; and the cradle frame is connected to the mounting seat.

3. The electric baby bouncer according to claim 1, wherein a left photoelectric switch and a right photoelectric switch are provided in the base and configured to sense a movement distance of the X-axis moving plate; and the left photoelectric switch and the right photoelectric switch are connected to the controller.

4. The electric baby bouncer according to claim 1, wherein the cradle frame is connected to a toy bar.

5. The electric baby bouncer according to claim 1, wherein a top part of the X-axis moving plate is provided with four upper rod sleeves; a bottom part of the Z-axis moving plate is connected to four upper guide rods; the four upper guide rods respectively corresponds to the four upper rod sleeves; and the four upper guide rods are respectively nested inside the four upper rod sleeves.

6. An electric baby bouncer, comprising a base and a cradle frame, wherein an X-axis moving plate for performing a horizontal linear reciprocating motion and an X-axis driving mechanism for driving the X-axis moving plate to move are provided in the base; a Z-axis moving plate for performing a vertical linear reciprocating motion is provided above the X-axis moving plate; a Z-axis driving mechanism for driving the Z-axis moving plate to move is provided on the X-axis moving plate; a bottom part of the cradle frame is connected to the Z-axis moving plate; the Z-axis moving plate is configured to extend out of a top part of the base; a top surface of the base is provided with a controller; and the X-axis driving mechanism and the Z-axis driving mechanism are controlled by the controller;

wherein the X-axis driving mechanism comprises an X-axis driving motor, an X-axis small pulley, an X-axis big pulley, an X-axis worm, an X-axis big gear, and an X-axis small gear; wherein the X-axis small pulley is connected to an output shaft of the X-axis driving motor; the X-axis small pulley and the X-axis big pulley are connected through a transmission belt; the X-axis big pulley is connected to an end of the X-axis worm; the X-axis big gear is meshed with the X-axis worm; the X-axis small gear is coaxial with the X-axis big gear and located below the X-axis big gear; an X-axis rack is connected inside the base; the X-axis small gear is meshed with the X-axis rack; a top part of the X-axis moving plate is provided with an X-axis device cover; and the X-axis driving motor, the X-axis worm, and the X-axis big gear are located inside the X-axis device cover.

7. An electric baby bouncer, comprising a base and a cradle frame, wherein an X-axis moving plate for performing a horizontal linear reciprocating motion and an X-axis driving mechanism for driving the X-axis moving plate to move are provided in the base; a Z-axis moving plate for performing a vertical linear reciprocating motion is provided above the X-axis moving plate; a Z-axis driving mechanism for driving the Z-axis moving plate to move is provided on the X-axis moving plate; a bottom part of the cradle frame is connected to the Z-axis moving plate; the Z-axis moving plate is configured to extend out of a top part of the base; a top surface of the base is provided with a controller; and the X-axis driving mechanism and the Z-axis driving mechanism are controlled by the controller; wherein the Z-axis driving mechanism comprises a Z-axis driving motor, a Z-axis small pulley, a Z-axis big pulley, a Z-axis worm, a Z-axis big gear, and a Z-axis small gear; wherein the Z-axis small pulley is connected to an output shaft of the Z-axis driving motor; the Z-axis small pulley and the Z-axis big pulley are connected through a transmission belt; the Z-axis big pulley is connected to an end of the Z-axis worm; the Z-axis big gear is meshed with the Z-axis worm; the Z-axis small gear is coaxial with the Z-axis big gear and located at a side of the Z-axis big gear; a bottom part of the Z-axis moving plate is connected to a Z-axis rack; the Z-axis small gear is meshed with the Z-axis rack; a top part of the X-axis moving plate is provided with a Z-axis device cover; the Z-axis driving motor, the Z-axis worm, the Z-axis big gear, and the Z-axis small gear are located inside the Z-axis device cover; and the Z-axis rack passes through the Z-axis device cover.

8. The electric baby bouncer according to claim 7, wherein a top surface of the Z-axis device cover is provided with an upper photoelectric switch; the top part of the X-axis moving plate is provided with a lower photoelectric switch; the bottom part of the Z-axis moving plate is connected to a lifting rod; and a bottom part of the lifting rod is provided with a backwardly extending sensing plate.

* * * * *